(12) United States Patent
Cahayla

(10) Patent No.: US 9,021,960 B1
(45) Date of Patent: May 5, 2015

(54) ISOLATED COAXIAL HIGH-PRESSURE FEED-THROUGH FITTING

(71) Applicant: Jason Cahayla, West Milford, NJ (US)

(72) Inventor: Jason Cahayla, West Milford, NJ (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 0 days.

(21) Appl. No.: 13/911,472

(22) Filed: Jun. 6, 2013

(51) Int. Cl.
    *F42B 5/26* (2006.01)
    *F42B 5/02* (2006.01)
    *F42B 5/08* (2006.01)
    *H02G 3/22* (2006.01)

(52) U.S. Cl.
    CPC ... *F42B 5/26* (2013.01); *H02G 3/22* (2013.01)

(58) Field of Classification Search
    USPC ......... 102/464, 465, 466, 467, 468, 469, 470, 102/472, 481; 89/6, 6.5
See application file for complete search history.

(56) References Cited

U.S. PATENT DOCUMENTS

| | | | | |
|---|---|---|---|---|
| 3,814,017 A * | 6/1974 | Backstein et al. | ............ | 102/215 |
| 7,475,625 B1 * | 1/2009 | Niemeyer et al. | ................... | 89/6 |
| 7,878,120 B1 * | 2/2011 | Nodarse et al. | ............... | 102/472 |
| 8,042,470 B2 * | 10/2011 | Dietrich et al. | ............... | 102/215 |
| 8,215,237 B2 * | 7/2012 | Geswender | ................... | 102/464 |

* cited by examiner

*Primary Examiner* — James S Bergin
(74) *Attorney, Agent, or Firm* — Henry S. Goldfine

(57) ABSTRACT

An isolated, coaxial, high pressure feed-through fitting provides two electrical paths through a barrier. The fitting includes an outer dielectric disposed in an opening in the barrier. A conductive housing with a central through bore is disposed in the outer dielectric. An inner dielectric is disposed in the through bore in the conductive housing. A central conductor is disposed in the inner dielectric. One electrical path includes the central conductor and another electrical path includes the conductive housing. Flanged portions on the conductive housing and the central conductor bear on flanged portions of the outer dielectric and the inner dielectric, respectively, to create a high pressure seal.

20 Claims, 8 Drawing Sheets

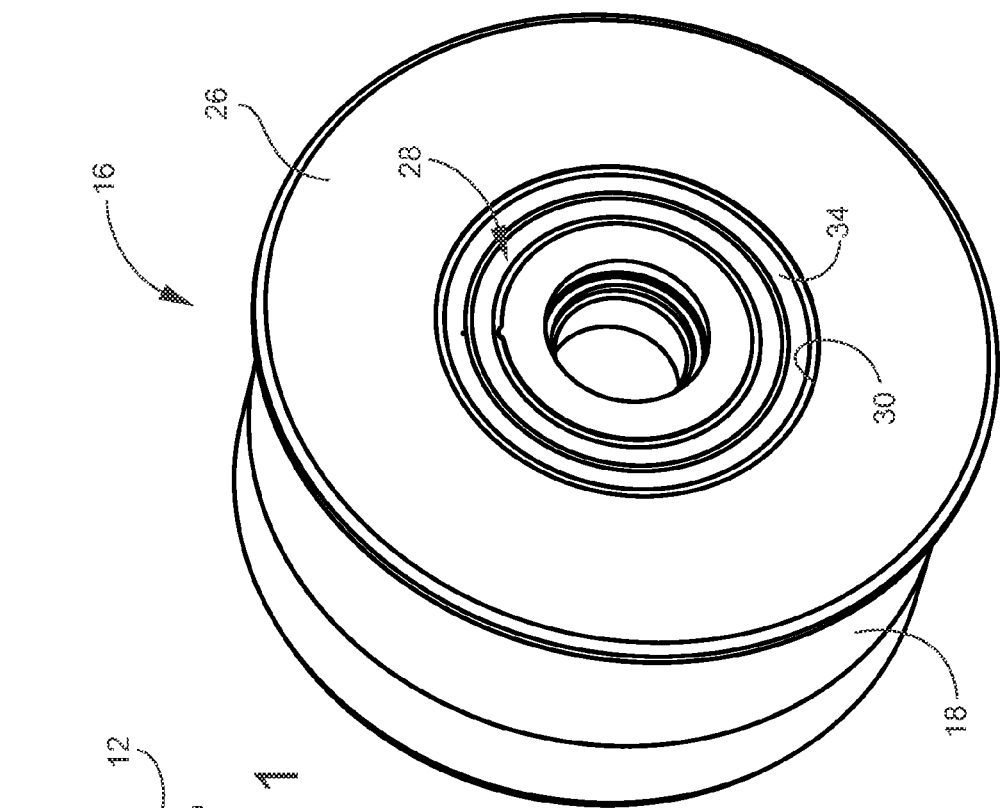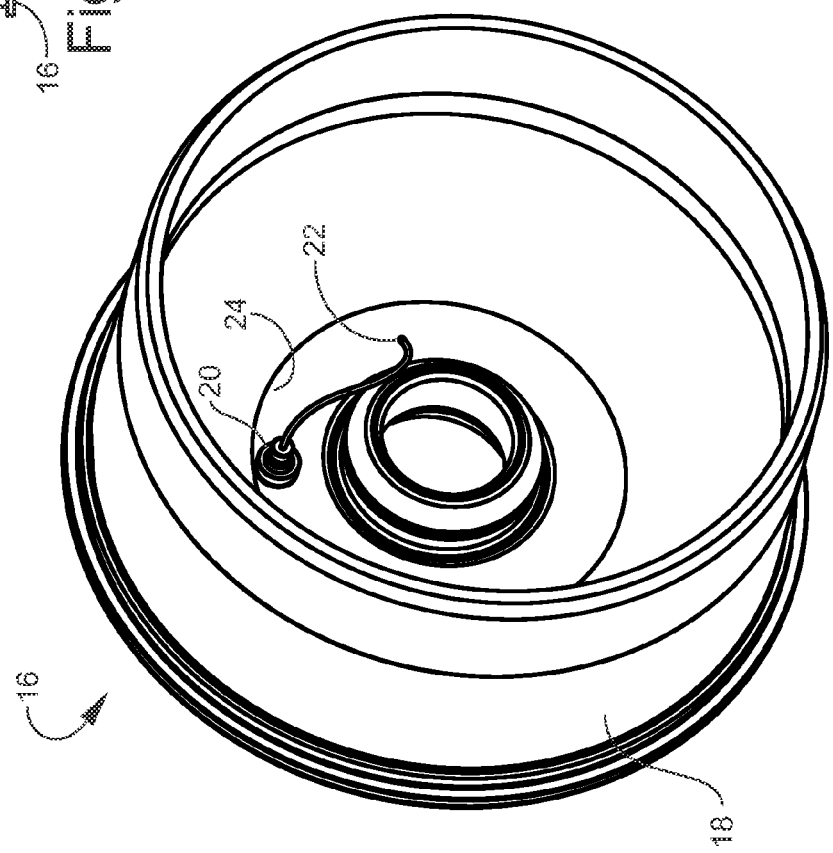

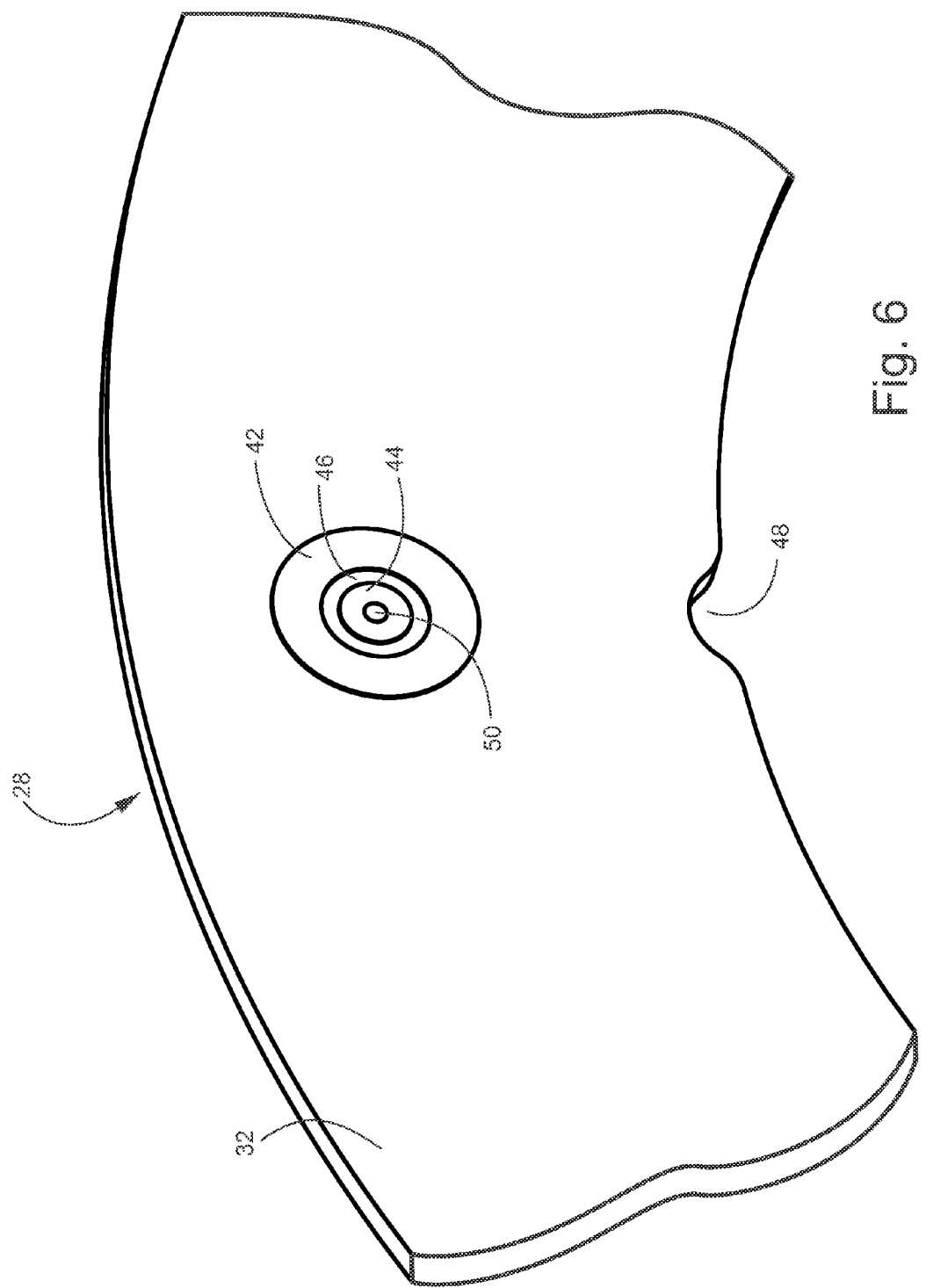

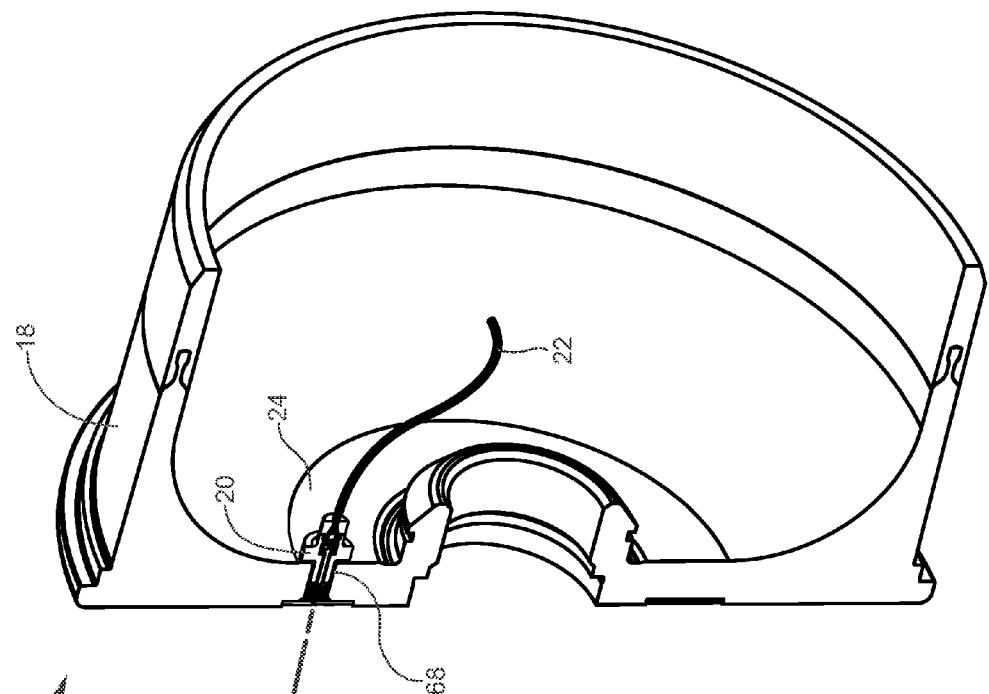
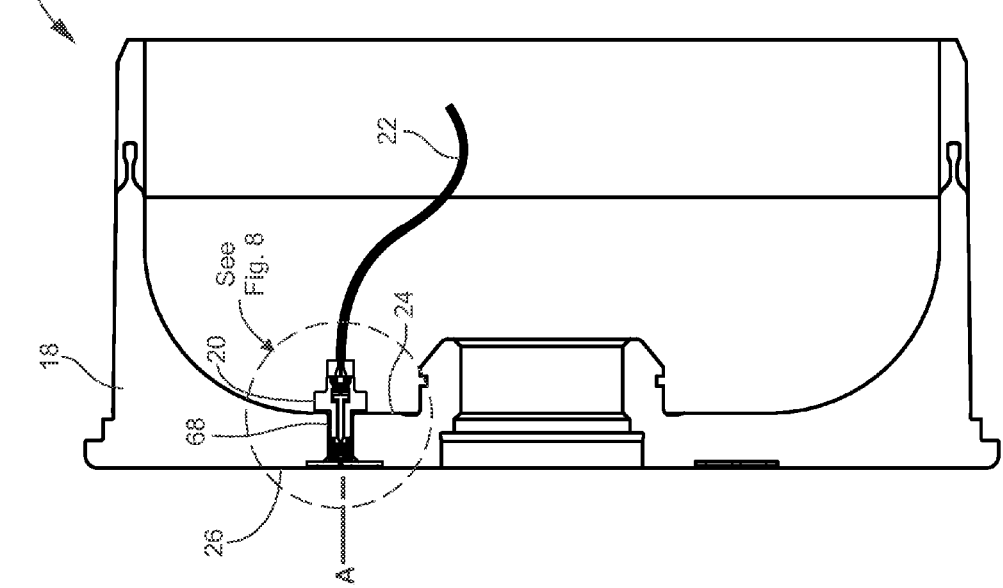

ISOLATED COAXIAL HIGH-PRESSURE FEED-THROUGH FITTING

STATEMENT OF GOVERNMENT INTEREST

The inventions described herein may be manufactured, used and licensed by or for the United States Government.

BACKGROUND OF THE INVENTION

The invention relates in general to high-pressure, sealed electrical conduits and in particular to high-pressure, sealed electrical conduits used in munitions.

An ammunition data link (ADL) enables a fire control system to directly communicate with electronic devices disposed in a munition that has been loaded into a gun tube for firing. Examples of munitions that use an ADL include 120 mm tank rounds. The ADL must deliver data to the munition and must also seal the case of the munition against ultra-high pressure combustion gases.

Existing ADLs on 120 mm munitions require two coaxial conduits or feed-through devices. A known feed-through fitting is shown in U.S. Pat. No. 7,878,120 issued on Feb. 1, 2011. Because the known fitting has only one electrical path, two fittings are required. The use of two feed-throughs per munition requires more machining of the munition case, increased chances of failure, and twice the amount of fittings and cables, compared to a single feed-through fitting. The known design uses two high pressure coaxial feed-throughs that are screwed into two machined holes in the base of the munition case. One end of the feed-through includes a spring-loaded conductive plunger that contacts the rearward section of an ADL card, thereby providing a contact element for the breech. The other end of the feed-through includes a GPO®/SMP (SubMiniature Push-on) type of cable connector for routing cable to the interior of the munition.

A need exists for a less expensive, simpler, and robust feed-through design for routing electrical signals through the case of a munition.

SUMMARY OF INVENTION

One aspect of the invention is an isolated, coaxial, high pressure feed-through fitting. The fitting includes an outer dielectric and a conductive housing. The outer dielectric has a hollow cylindrical portion and a flanged portion. The conductive housing has a central through bore and a flanged portion. The conductive housing is concentrically disposed in the hollow cylindrical portion of the outer dielectric. An outer surface of the conductive housing abuts an inner surface of the outer dielectric. The flanged portion of the conductive housing abuts the flanged portion of the outer dielectric.

The fitting includes an inner dielectric having a hollow cylindrical portion and a flanged portion. The inner dielectric is concentrically disposed in the central through bore of the conductive housing. An outer surface of the inner dielectric hollow cylindrical portion abuts a surface of the conductive housing that defines the central through bore. The inner dielectric flanged portion abuts a shoulder of the central through bore.

A central conductor is concentrically disposed in the central through bore. A first end of the central conductor includes a flanged portion and an inner connection pin. The central conductor flanged portion abuts the inner dielectric flanged portion. The inner connection pin is configured to mate with a coaxial cable connector.

The fitting may include a female contact receptacle concentrically disposed in the central through bore of the conductive housing. A second end of the central conductor may be translatably disposed in the female contact receptacle. A contact spring may be disposed between a second inner surface of the outer dielectric and a second outer surface of the conductive housing. The contact spring may form a press fit with the second outer surface of the conductive housing. The female contact receptacle may include a flexure that bears on the second end of the central conductor. The outer surface of the conductive housing may include a shoulder and one end of the contact spring may abut the shoulder.

The outer surface of the conductive housing and the inner surface of the outer dielectric may form a press fit. The outer surface of the conductive housing may include a retention detent. The central conductor may form a press fit with the hollow cylindrical portion of the inner dielectric. The outer surface of the inner dielectric hollow cylindrical portion may form a press fit with the surface of the conductive housing that defines the central through bore.

Another aspect of the invention is an apparatus having a case base. The case base includes distal and proximal surfaces. An opening extends between the distal and proximal surfaces, and the opening has a central longitudinal axis. An ammunition data link (ADL) board is disposed in a groove in the distal surface of the case base. The ADL board has proximal and distal surfaces. The ADL board distal surface includes a distal outer contact ring, a distal inner contact ring, and a distal dielectric ring between the distal inner and distal outer contact rings. The ADL board proximal surface includes a proximal outer contact ring, a proximal inner contact ring, and a proximal dielectric ring between the proximal inner and proximal outer contact rings.

A via in the ADL board connects the distal outer contact ring and the proximal inner contact ring. Another via in the ADL board connects the distal inner contact ring and the proximal outer contact ring. A novel isolated, coaxial, high pressure feed-through fitting is disposed in the opening in the case base.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 1 is a schematic drawing of a munition.

FIG. 2 is a perspective front view of the case base assembly of the munition of FIG. 1.

FIG. 3 is a perspective rear view of FIG. 2.

FIG. 6 is an enlarged view of a portion of the proximal surface of an ADL board.

FIGS. 7A and 7B are cutaway side and perspective views, respectively, of the interior of the case base assembly.

DETAILED DESCRIPTION

Figure 4:
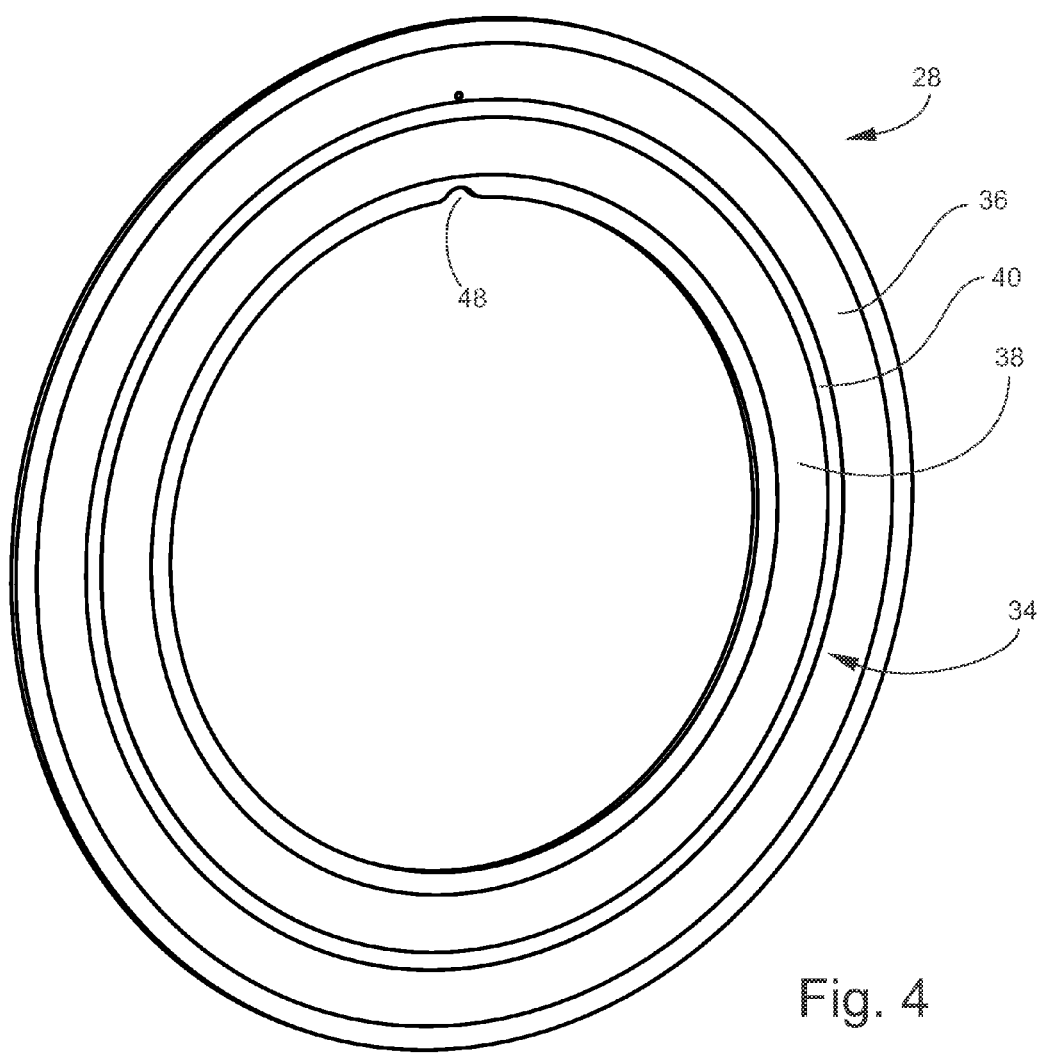
FIG. 4 is a perspective view of the distal surface of an ADL board.

A coaxial feed-through fitting includes two conductive elements that enable electrical communication through a barrier subject to high pressure. The barrier may be a munition casing, in which case the feed-through fitting enables communication from inside the munition to a device that is external to the munition. The coaxial feed-through fitting withstands and seals the ultra-high pressure created in the munition during a ballistic event. The electrical communication may or may not be intact during or after the ballistic event. The munition is loaded into a gun tube, for example, from the breech of the gun tube. When the breech is closed, twin ADL conductive rings on the base of the munition case make contact with breech contacts to provide electrical conductivity from the breech to the munition. The one piece, twin conductor coaxial feed-through fitting provides a pathway for electrical signals from the ADL conductive ring to the munition's electrical cable.

FIG. 1 is a schematic drawing of a munition 10 having a munition case 12 with a projectile 14 disposed therein. Case 12 includes a case base assembly 16. FIGS. 2 and 3 are perspective front and rear views, respectively, of case base assembly 16. Assembly 16 includes a case base 18 having a proximal surface 24 and a distal surface 26. An isolated, coaxial, high pressure feed-through fitting 20 is disposed in an opening in case base 18. A coaxial cable 22 is connected at one end to fitting 20 in the interior of case base 18. Another end of cable 22 leads to one or more electronic devices (not shown), such as fuzes, global positioning systems, etc., disposed in munition case 12.

Figure 5:
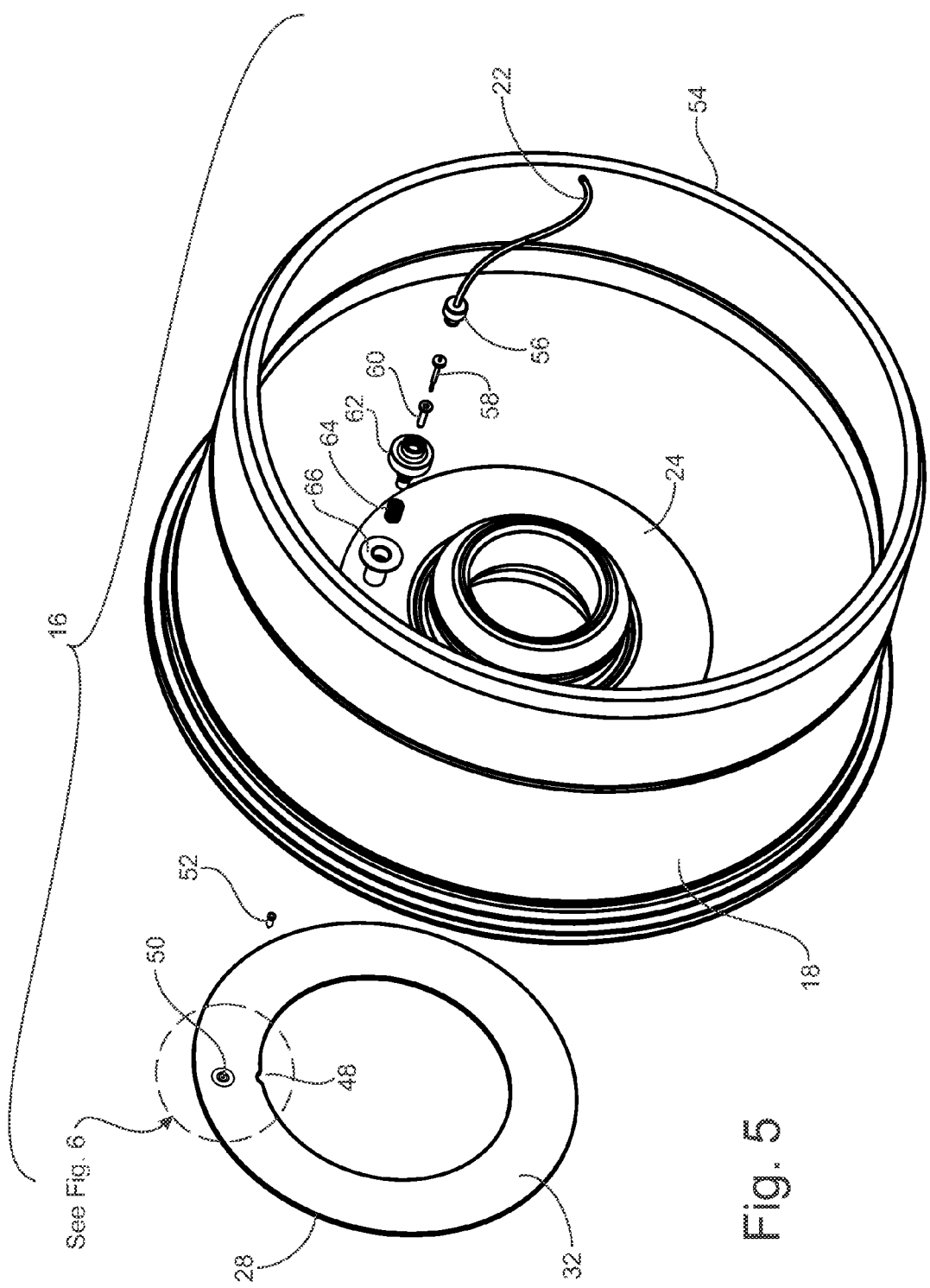
FIG. 5 is an exploded view of the case base assembly.

An ADL board 28 having a dielectric substrate or base is disposed in a groove 30 in distal surface 26 of case base 18. ADL board 28 includes a distal surface 34 and a proximal surface 32 (FIGS. 5 and 6). As seen in FIG. 4, ADL board distal surface 26 includes a distal outer contact ring 36, a distal inner contact ring 38, and a distal dielectric ring 40 between distal inner contact ring 38 and distal outer contact ring 36. An indexing feature 48 is formed in ADL board 28 to position board 28 in groove 30 of distal surface 26 of case base 18.

As seen in FIGS. 5 and 6, ADL board proximal surface 32 includes a proximal outer contact ring 42, a proximal inner contact ring 44, and a proximal dielectric ring 46 between proximal inner contact ring 44 and proximal outer contact ring 42. Contact rings 36, 38, 42, and 44 are annuli made of a conductive metallic material. A mounting hole 50 in ADL board 28 enables attachment of a contact receptacle 52 (FIG. 5). Contact receptacle 52 may be fixed in hole 50 by, for example, soldering. The surface that defines mounting hole 50 in ADL board 28 functions as a via that electrically connects distal outer contact ring 36, proximal inner contact ring 44, and contact receptacle 52. A via 70 (shown in phantom lines in FIG. 8) disposed in ADL board 28 electrically connects distal inner contact ring 38 and proximal outer contact ring 42.

Other components of case base assembly 16 shown in FIG. 5 include a rubber seal 54 that seals case base assembly 16 from leakage in breech during gun launch and a coaxial cable connecter 56 fixed to coaxial cable 22. Components of feed-through fitting 20 shown in FIG. 5 include a central conductor 58, an inner dielectric 60, a conductive housing 62, a contact spring 64, an outer dielectric 66 and contact receptacle 52.

Referring to FIGS. 7A and 7B, fitting 20 is disposed in an opening 68 that extends between distal and proximal surfaces 26, 24 of case base 18. Opening 68 has a central longitudinal axis A.

Figure 8:
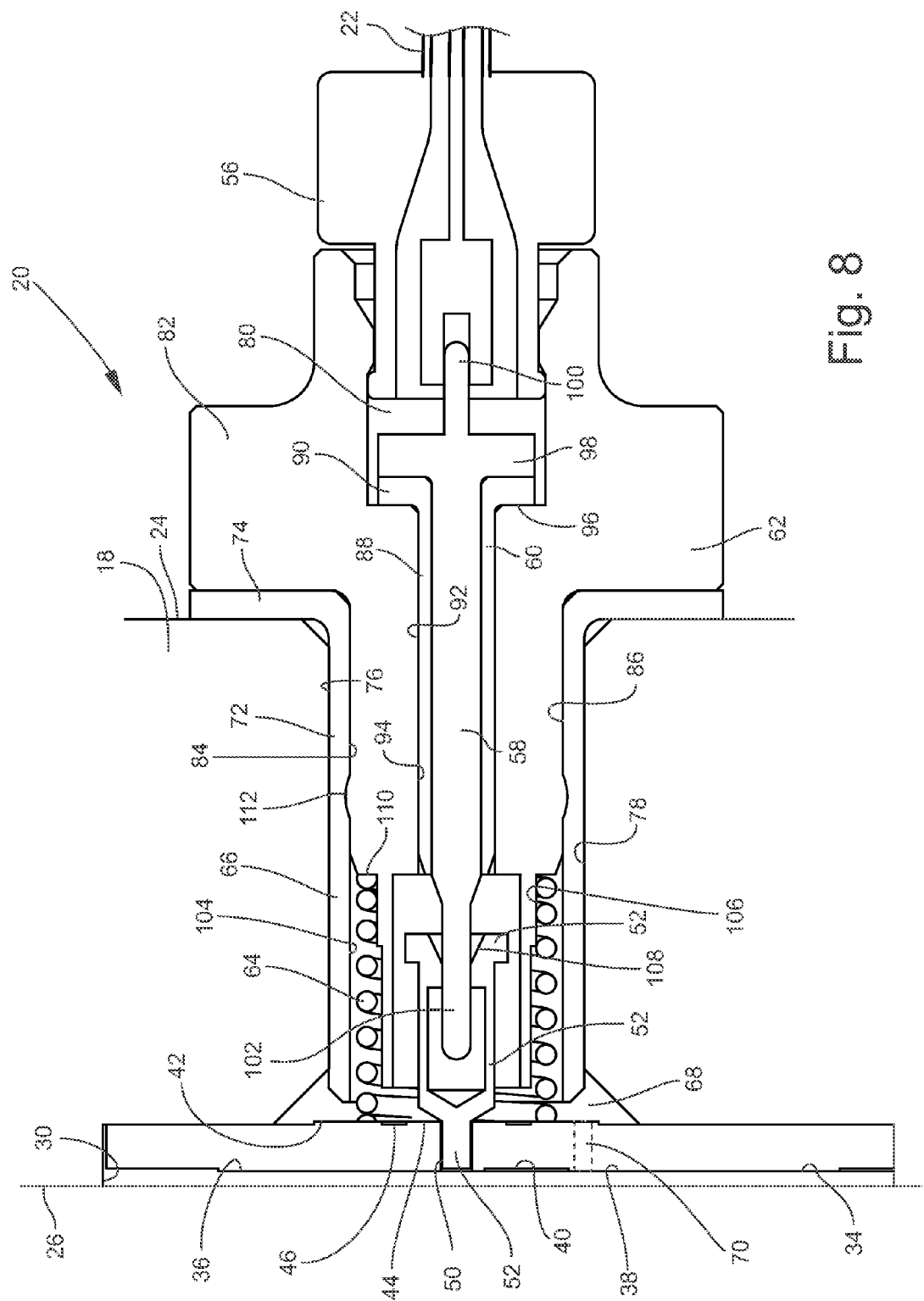
FIG. 8 is an enlarged view of a portion of FIG. 7A.

Referring to FIG. 8, outer dielectric 66 includes a hollow cylindrical portion 72 and a flanged portion 74. An outer surface 76 of hollow cylindrical portion 72 abuts a case base surface 78 that defines opening 68. Flanged portion 74 abuts proximal case base surface 24. Conductive housing 62 includes a central through bore 80 and a flanged portion 82. Flanged portion 82 of conductive housing 62 abuts flanged portion 74 of outer dielectric 66. An outer surface 84 of conductive housing 62 abuts an inner surface 86 of outer dielectric 66. Outer surface 84 of conductive housing 62 and inner surface 86 of outer dielectric 66 may form a press fit. Outer surface 84 of conductive housing 62 may include one or more retention detents 112 or may be mechanically fastened by other means. Retention decent 112 may plastically deform inner surface 86 of outer dielectric 66 as conductive housing 62 is assembled into outer dielectric 66.

An inner dielectric 60 has a hollow cylindrical portion 88 and a flanged portion 90. Inner dielectric 60 is concentrically disposed in central through bore 80 of conductive housing 62. An outer surface 92 of inner dielectric hollow cylindrical portion 88 abuts a surface 94 of conductive housing 62 that defines central through bore 80. Outer surface 92 of inner dielectric hollow cylindrical portion 88 may form a press fit with surface 94 of conductive housing 62 that defines central through bore 80. Inner dielectric flanged portion 90 abuts a shoulder 96 of central through bore 80.

A central conductor 58 is concentrically disposed in central through bore 80. Central conductor 58 may form a press fit with hollow cylindrical portion 88 of inner dielectric 60. One end of central conductor 58 has a flanged portion 98 and an inner connection pin 100. Central conductor flanged portion 98 abuts inner dielectric flanged portion 90. Inner connection pin 100 is configured to mate with a coaxial cable connector 56.

Female contact receptacle 52 is concentrically disposed in central through bore 80 of conductive housing 62 and electrically connected to proximal inner contact ring 44 of ADL board 28. One end 102 of central conductor 58 is translatably disposed in female contact receptacle 52. Female contact receptacle 52 may include a flexure that bears on end 102 of central conductor 58 therein. The flexure may be, for example, a leaf spring 108.

A contact spring 64 is disposed between a second inner surface 104 of outer dielectric 66 and a second outer surface 106 of conductive housing 62. Outer surface 106 of conductive housing 62 may include a shoulder 110. One end of contact spring 64 may abut shoulder 110. Contact spring 64 may form a press fit with second outer surface 106 of conductive housing 62. Contact spring 64 is electrically connected to proximal outer contact ring 42 of ADL board 28.

Fitting 20 provides two electrically conductive pathways that enable electrical communication between, for example, coaxial cable connector 56 and ADL board 28. One electrical path includes distal outer contact ring 36, mounting hole 50, proximal inner contact ring 44, female receptacle 52, central conductor 58, and inner connection pin 100. Inner connection pin 100 is inserted in the central opening in coaxial cable connector 56. The other path includes distal inner contact ring 38, via 70, proximal outer contact ring 42, contact spring 64, and conductive housing 62. Conductive housing 62 engages a conductive external surface of coaxial cable connector 56.

Fitting 20 provides high pressure sealing. High pressure may be generated from, for example, the combustion of propellant. The high pressure results in bearing stress being applied to flanged portion 98 of central conductor 58 and flanged portion 82 of conductive housing 62. Flanged portion 98 bears on inner dielectric flanged portion 90 and flanged portion 82 bears on outer dielectric flanged portion 74. Dielectric flanged portions 90, 74 may be elastically and/or plastically deformed by the bearing stress to thereby create a high pressure seal. Electrical conductivity through fitting 20 may or may not be maintained during or after high pressure application.

Figure 9:
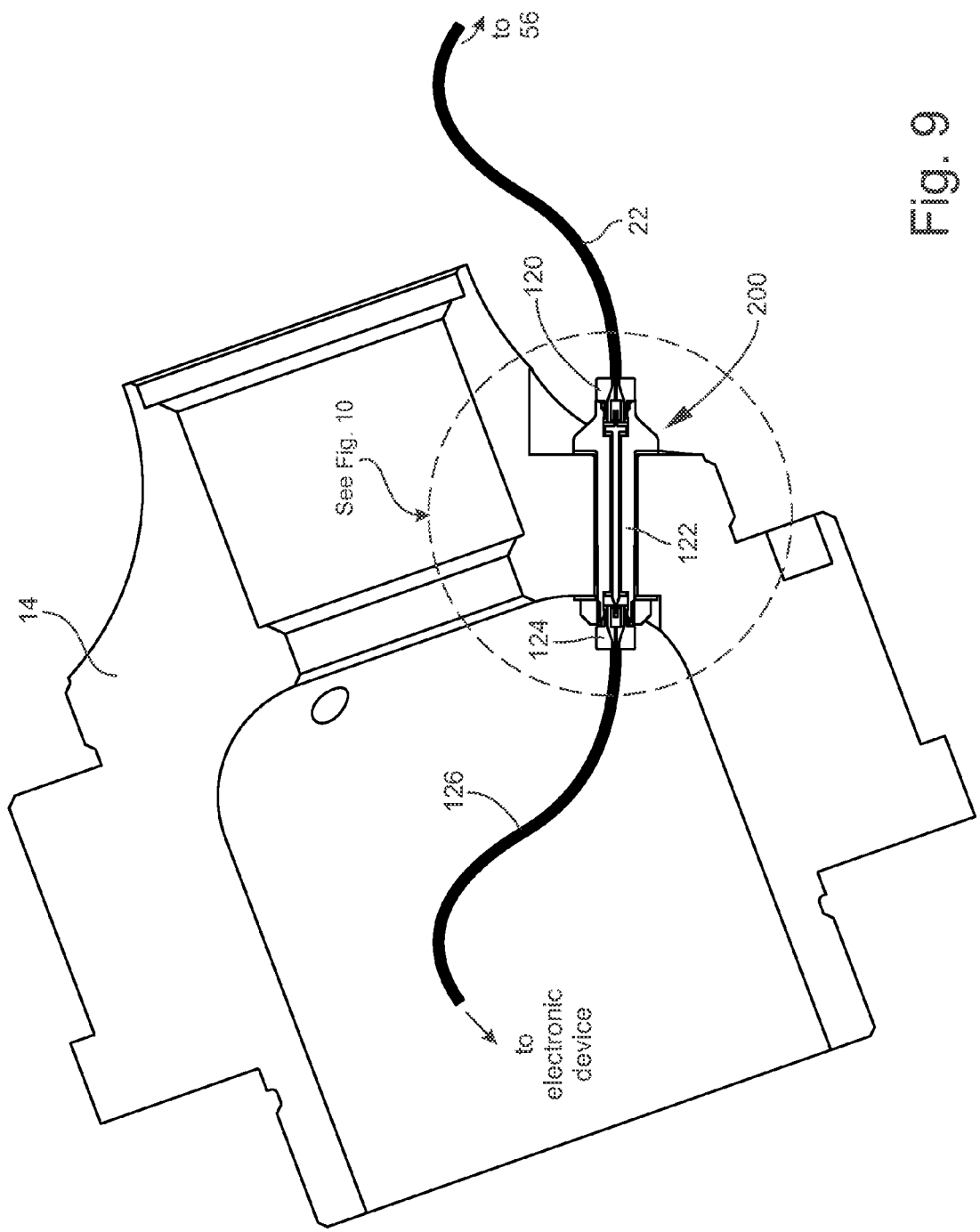
FIG. 9 is a cutaway side view of another embodiment of a feed-through fitting.

FIG. 9 is a cutaway side view of another embodiment of an isolated, coaxial, high pressure feed-through fitting 200. Fitting 200 may be used, for example, in another portion of munition 10, for example, in projectile 14. Coaxial cable 22 may be connected at one end to coaxial cable connector 56 (FIG. 5) and at another end to a coaxial cable connector 120. Cable 22 may be disposed in, for example, the portion of munition case 12 that contains propellant. Connector 120 connects to fitting 200, which is disposed in an opening 122 in projectile 14. Fitting 200 mates with a coaxial cable connector 124 and a coaxial cable 126. Cable 126 may be connected to, for example, an electronic device in projectile 14, such as a fuze.

Figure 10:
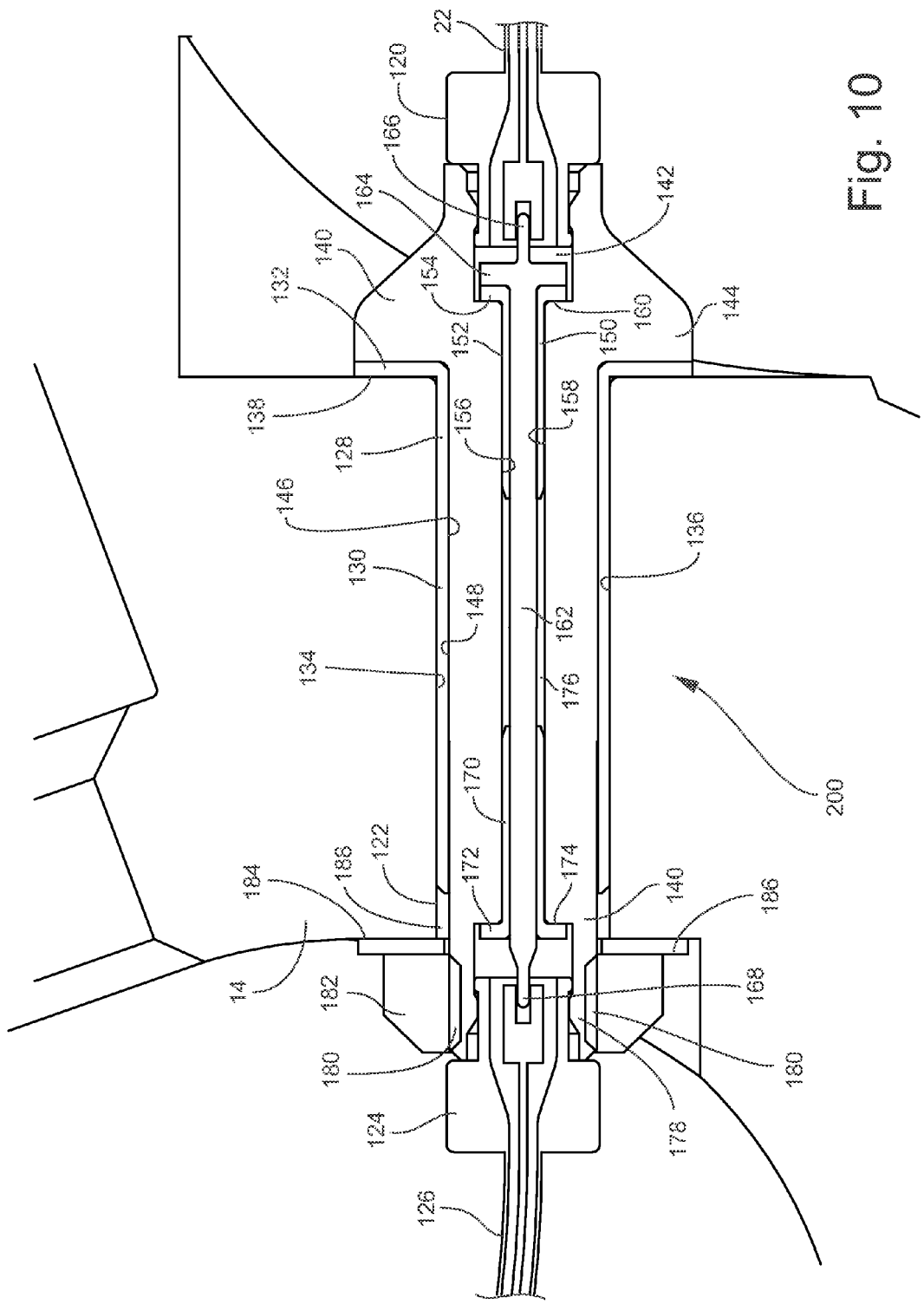
FIG. 10 is an enlarged view of a portion of FIG. 9.

The high pressure side of fitting 200 (right hand side in FIG. 9) is constructed similar to the high pressure side of fitting 20. As shown in the enlarged view of FIG. 10, fitting 200 includes an outer dielectric 128 having a hollow cylindrical portion 130 and a flanged portion 132. An outer surface 134 of hollow cylindrical portion 130 abuts a projectile surface 136 that defines opening 122 in projectile 14. Flanged portion 132 abuts a projectile surface 138. Conductive housing 140 includes a central through bore 142 and a flanged portion 144. Flanged portion 144 of conductive housing 140 abuts flanged portion 132 of outer dielectric 128. An outer surface 146 of conductive housing 140 abuts an inner surface 148 of outer dielectric 128. Outer surface 146 of conductive housing 140 and inner surface 148 of outer dielectric 128 may form a press fit.

An inner dielectric 150 has a hollow cylindrical portion 152 and a flanged portion 154. Inner dielectric 150 is concentrically disposed in central through bore 142 of conductive housing 140. An outer surface 156 of inner dielectric hollow cylindrical portion 152 abuts a surface 158 of conductive housing 140 that defines central through bore 142. Outer surface 156 of inner dielectric hollow cylindrical portion 152 may form a press fit with surface 158 of conductive housing 140 that defines central through bore 142. Inner dielectric flanged portion 154 abuts a shoulder 160 of central through bore 142.

A central conductor 162 is concentrically disposed in central through bore 142. Central conductor 162 may form a press fit with hollow cylindrical portion 152 of inner dielectric 150. One end of central conductor 162 has a flanged portion 164 and a connection pin 166. Central conductor flanged portion 164 abuts inner dielectric flanged portion 154. Connection pin 166 is configured to mate with coaxial cable connector 120.

The opposite side of fitting 200 is constructed somewhat differently than in fitting 20. In fitting 200, central conductor 162 has a connection pin 168 that mates with coaxial cable connector 124. An inner dielectric 170 is disposed around central conductor 162. An air gap 176 may separate ends of inner dielectrics 150 and 170, or the ends may abut each other. A flanged portion 172 of inner dielectric 170 bears on a shoulder 174 in central through bore 142. The end 178 of conductive housing 140 is secured by, for example, a threaded engagement 180 with a nut 182. Nut 182 is insulated from projectile surface 184 by a dielectric washer 186. An air gap 188 may exist between washer 186 and outer dielectric 128, or outer dielectric 128 may abut washer 186.

Fitting 200 provides two electrically conductive pathways that enable electrical communication between, for example, coaxial cable connectors 120 and 124. One electrical path includes connection pin 168 inserted in connector 124, central conductor 162, and connection pin 166 inserted in connector 120. The other path includes conductive housing 140 and external contact surfaces of connectors 120 and 124. The structure of fitting 200 at the high pressure side provides an effective seal against propellant gases in a manner similar to fitting 20.

Fittings 20 and 200 may be used to provide isolated, coaxial electrical paths through a barrier that is subject to ultra-high pressures. The dielectric components of fittings 20 and 200 may be made of, for example, a polymer, such as ULTEM® 1000. To further ensure a high pressure seal, a room temperature vulcanizing (RTV) plastic may be applied at the outer circumferential perimeters of respective flanged portions 74, 132 of outer dielectrics 66, 128 where those flanged portions contact surfaces 24, 138, respectively.

While the invention has been described with reference to certain embodiments, numerous changes, alterations and modifications to the described embodiments are possible without departing from the spirit and scope of the invention as defined in the appended claims, and equivalents thereof.

What is claimed is:

1. An isolated, coaxial, high pressure feed-through fitting, comprising:
   an outer dielectric having a hollow cylindrical portion and a flanged portion;
   a conductive housing having a central through bore and a flanged portion, the conductive housing being concentrically disposed in the hollow cylindrical portion of the outer dielectric with an outer surface of the conductive housing abutting an inner surface of the outer dielectric and the flanged portion of the conductive housing abutting the flanged portion of the outer dielectric;
   an inner dielectric having a hollow cylindrical portion and a flanged portion, the inner dielectric being concentrically disposed in the central through bore with an outer surface of the inner dielectric hollow cylindrical portion abutting a surface of the conductive housing that defines the central through bore, and the inner dielectric flanged portion abutting a shoulder of the central through bore; and
   a central conductor concentrically disposed in the central through bore, a first end of the central conductor having a flanged portion and an inner connection pin, the central conductor flanged portion abutting the inner dielectric flanged portion and the inner connection pin being configured to mate with a coaxial cable connector.

2. The feed-through fitting of claim 1, further comprising,
   a female contact receptacle concentrically disposed in the central through bore of the conductive housing;
   a second end of the central conductor translatably disposed in the female contact receptacle; and
   a contact spring disposed between a second inner surface of the outer dielectric and a second outer surface of the conductive housing.

3. The feed-through fitting of claim 2, wherein the contact spring forms a press fit with the second outer surface of the conductive housing.

4. The feed-through fitting of claim 3, wherein the outer surface of the conductive housing includes a shoulder and one end of the contact spring abuts the shoulder.

5. The feed-through fitting of claim 2, wherein the female contact receptacle includes a flexure that bears on the second end of the central conductor.

6. The feed-through fitting of claim 1, wherein the outer surface of the conductive housing and the inner surface of the outer dielectric form a press fit and further wherein the outer surface of the conductive housing includes a retention detent.

7. The feed-through fitting of claim 6, wherein the central conductor forms a press fit with the hollow cylindrical portion of the inner dielectric.

8. The feed-through fitting of claim 7, wherein the outer surface of the inner dielectric hollow cylindrical portion forms a press fit with the surface of the conductive housing that defines the central through bore.

9. An isolated, coaxial, high pressure feed-through fitting for a case base having distal and proximal surfaces and an opening extending between the distal and proximal surfaces, the opening having a central longitudinal axis, the feed-through fitting comprising:
an outer dielectric having a hollow cylindrical portion and a flanged portion, the outer dielectric being concentrically disposed in the opening with an outer surface of the hollow cylindrical portion abutting a case base surface that defines the opening, and the flanged portion abutting the proximal case base surface;
a conductive housing having a central through bore and a flanged portion, the conductive housing being concentrically disposed in the hollow cylindrical portion of the outer dielectric with an outer surface of the conductive housing abutting an inner surface of the outer dielectric and the flanged portion of the conductive housing abutting the flanged portion of the outer dielectric;
an inner dielectric having a hollow cylindrical portion and a flanged portion, the inner dielectric being concentrically disposed in the opening and the central through bore with an outer surface of the hollow cylindrical portion abutting a conductive housing surface that defines the central through bore, and the flanged portion abutting a shoulder of the central through bore;
a central conductor concentrically disposed in the opening and the central through bore, one end of the central conductor having a flanged portion and an inner connection pin, the flanged portion abutting the flanged portion of the inner dielectric and the inner connection pin being configured to mate with a coaxial cable connector;
a female contact receptacle concentrically disposed in the central through bore of the housing and having translatably disposed therein another end of the central conductor; and
a contact spring disposed between a second inner surface of the outer dielectric and a second outer surface of the conductive housing.

10. The feed-through fitting of claim 9, wherein the outer surface of the outer dielectric hollow cylindrical portion forms a press fit with the case base surface that defines the opening.

11. The feed-through fitting of claim 10, wherein the outer surface of the conductive housing and the inner surface of the outer dielectric form a press fit and further wherein the outer surface of the conductive housing includes a retention detent.

12. The feed-through fitting of claim 11, wherein the outer surface of the inner dielectric hollow cylindrical portion forms a press fit with the surface of the conductive housing that defines the central through bore.

13. The feed-through fitting of claim 12, wherein the central conductor forms a press fit with the hollow cylindrical portion of the inner dielectric.

14. The feed-through fitting of claim 13, wherein the contact spring forms a press fit with the second outer surface of the conductive housing.

15. The feed-through fitting of claim 14, wherein the female contact receptacle includes a flexure that bears on the other end of the central conductor.

16. The feed-through fitting of claim 15, wherein the outer surface of the conductive housing includes a shoulder and one end of the contact spring abuts the shoulder.

17. An apparatus, comprising:
a case base having distal and proximal surfaces and an opening extending between the distal and proximal surfaces, the opening having a central longitudinal axis;
an ammunition data link (ADL) board disposed in a groove in the distal surface of the case base, the ADL board having proximal and distal surfaces;
the ADL board distal surface including a distal outer contact ring, a distal inner contact ring, and a distal dielectric ring between the distal inner and distal outer contact rings;
the ADL board proximal surface including a proximal outer contact ring, a proximal inner contact ring, and a proximal dielectric ring between the proximal inner and proximal outer contact rings;
a via disposed in the ADL board that connects the distal outer contact ring and the proximal inner contact ring;
a second via disposed in the ADL board that connects the distal inner contact ring and the proximal outer contact ring; and
an isolated, coaxial, high pressure feed-through fitting disposed in the opening in the case base, the feed-through fitting comprising,
an outer dielectric having a hollow cylindrical portion and a flanged portion with an outer surface of the hollow cylindrical portion abutting a case base surface that defines the opening, and the flanged portion abutting the proximal case base surface;
a conductive housing having a central through bore and a flanged portion, an outer surface of the conductive housing abutting an inner surface of the outer dielectric and the flanged portion of the conductive housing abutting the flanged portion of the outer dielectric;
an inner dielectric having a hollow cylindrical portion and a flanged portion, an outer surface of the inner dielectric hollow cylindrical portion abutting a surface of the conductive housing that defines the central through bore, and the inner dielectric flanged portion abutting a shoulder of the central through bore;
a central conductor concentrically disposed in the central through bore, a first end of the central conductor having a flanged portion and an inner connection pin, the central conductor flanged portion abutting the inner dielectric flanged portion and the inner connection pin being configured to mate with a coaxial cable connector;
a female contact receptacle concentrically disposed in the central through bore of the conductive housing and electrically connected to the proximal inner contact ring of the ADL board;
a second end of the central conductor translatably disposed in the female contact receptacle; and
a contact spring disposed between a second inner surface of the outer dielectric and a second outer surface of the conductive housing and electrically connected to the proximal outer contact ring of the ADL board.

18. The apparatus of claim 17, wherein the outer surface of the outer dielectric hollow cylindrical portion forms a press fit with the case base surface that defines the opening, the outer surface of the conductive housing forms a press fit with the inner surface of the outer dielectric, the outer surface of the inner dielectric hollow cylindrical portion forms a press fit with the surface of the conductive housing that defines the central through bore, and the central conductor forms a press fit with the hollow cylindrical portion of the inner dielectric.

19. The apparatus of claim 17, wherein the contact spring forms a press fit with the second outer surface of the conductive housing.

20. The apparatus of claim 17, wherein the female contact receptacle includes a flexure that bears on the second end of the central conductor.

\* \* \* \* \*